United States Patent
Hansen et al.

(10) Patent No.: US 6,847,394 B1
(45) Date of Patent: Jan. 25, 2005

(54) VIDEO INSPECTION DEVICE

(75) Inventors: Richard W. Hansen, San Jose, CA (US); Patrick Elmendorf, Castro Valley, CA (US); Bruce Shapiro, Menlo Park, CA (US); Virgil Chip Hennen, San Mateo, CA (US)

(73) Assignee: Snap-On Incorporated, Pleasant Prairie, WI (US)

( * ) Notice: Subject to any disclaimer, the term of this patent is extended or adjusted under 35 U.S.C. 154(b) by 0 days.

(21) Appl. No.: 09/311,907

(22) Filed: May 14, 1999

(51) Int. Cl.[7] .............................................. H04N 7/18
(52) U.S. Cl. ....................................................... 348/82
(58) Field of Search ............................. 348/82, 92, 93, 348/143, 148, 158, 373, 376; 73/587; H04N 7/18

(56) References Cited

U.S. PATENT DOCUMENTS

| | | | |
|---|---|---|---|
| 4,534,632 A | * 8/1985 | Laviolette | 348/373 |
| 4,699,463 A | * 10/1987 | D'Amelio et al. | 385/118 |
| 4,963,903 A | * 10/1990 | Cane | 348/143 |
| 5,065,249 A | * 11/1991 | Horn et al. | 348/376 |
| 5,305,356 A | * 4/1994 | Brooks et al. | 348/376 |
| 5,445,026 A | * 8/1995 | Eagan | 73/587 |
| 5,609,563 A | 3/1997 | Suzuki et al. | 600/118 |
| 5,829,913 A | 11/1998 | Puckett | 404/6 |
| 6,091,453 A | * 7/2000 | Coan et al. | 348/373 |
| 6,369,849 B1 | * 4/2002 | Rzyski | 348/82 |

FOREIGN PATENT DOCUMENTS

| | | |
|---|---|---|
| CA | 1323095 | 10/1993 |
| CA | 2188250 | 10/1995 |
| FR | 2775151 | 8/1999 |
| WO | WO 93/03575 | 2/1993 |

OTHER PUBLICATIONS

PCT Notification of Transmittal of The International Search Report or the Declaration dated Sep. 12, 2000.

* cited by examiner

Primary Examiner—Nhon Diep
(74) Attorney, Agent, or Firm—McDermott Will & Emery LLP (57) ABSTRACT

An inspection apparatus adapted for use in motor vehicle maintenance and repair is disclosed. A sensor, such as a video camera, is coupled by an elongated, flexible shaft to a self-contained, handheld power source. A source of illumination is mounted near the sensor and directs light onto an object that is viewed by the sensor. Input power to the sensor and the illumination source, and an output signal from the sensor, are coupled through the shaft, which will maintain any desired flexed position. Optionally, one or more microphones are mounted near the sensor to receive sounds produced by the object. Connectors extend from a housing of the power source so that the sensor output signal and an output from the microphones may be coupled to an external device. A removable clamp may be affixed to the apparatus so that the apparatus can be temporarily attached to a motor vehicle. As a result, a technician may easily visualize parts of the motor vehicle safely, clearly, and without disassembling the parts.

26 Claims, 5 Drawing Sheets

VIDEO INSPECTION DEVICE

FIELD OF THE INVENTION

The present invention relates to electronic inspection equipment. The invention relates more specifically to video inspection equipment useful in diagnostic and repair applications.

DESCRIPTION OF RELATED ART

Mechanical devices normally require periodic maintenance and repair. Some maintenance and repair operations involve a diagnostic phase in which a technician inspects or observes the device to determine what work is required or what defects are present. For complex mechanical devices such as internal combustion engines, carrying out diagnostic, maintenance and repair operations may be difficult because of the close proximity of parts and tight clearances between parts. The technician may be unable to visualize a particular part because it is adjacent to, inside of, or obscured by another part or assembly.

Under these circumstances, the technician may be forced to disassemble the mechanical device merely to visualize a possible problem source. If the problem is not located at the suspected source, the technician must re-assemble the device, wasting valuable time. In the field of motor vehicle repair, for example, diagnosing and repairing electrical problems associated with dashboard electronics may require the technician to disassemble the dashboard and its sub-assemblies—a time-consuming, complex task—merely to visualize parts and assess possible problems.

Thus, there is a need for an improved way to inspect complicated, obscured parts or assemblies without disassembling them.

A further problem is inadequate illumination. The engine and other parts of a motor vehicle typically are located within a compartment that is poorly illuminated or has no illumination. A technician may be able to locate a particular part, but may be unable to visualize it because of shadows cast on it or lack of direct or indirect illumination.

Accordingly, there is a need to improve visualization and inspection of equipment or parts to facilitate maintenance, diagnostic and repair.

Some mechanical maintenance and repair operations also require the technician to inspect or handle a mechanical device under dangerous conditions. For example, in motor vehicle repair, proper diagnosis of a problem may require the technician to inspect the vehicle engine while it is running. A technician who places the hands adjacent a hot, running engine risks a variety of injuries. Thus, there is a need to provide safe visualization and inspection under such conditions.

Once a problem area or failed part is visualized, the technician may wish to record an image for later review or inspection. In the field of motor vehicle repair, a technician may wish to make an image of a failed part to forward to the manufacturer for diagnosis or analysis. In conventional practice, to make an image of an obscured part or a part that is located within an assembly that cannot be visualized, the technician must disassemble one or more parts or sub-assemblies of the motor vehicle in order to photograph the failed part. This is undesirable because the context in which the failure occurred may be pertinent to failure analysis, but cannot be captured in an image once the parts or assemblies are taken apart.

Accordingly, there is a need for an improved method or apparatus of visualization that facilitates making images of parts in their original location or environment.

In motor vehicle repair, inspection devices called bore scopes are available for use in inspecting cylinders of internal combustion engines. Available bore scopes use fiber optic detectors to produce an image and typically have very limited image resolution. The images produced by bore scopes are not color images. Therefore, bore scopes are not suitable for inspection of wiring harnesses, and cables that use color-coding.

Thus, the usefulness of bore scopes is quite limited, and they cannot be used for inspection and visualization of large parts or assemblies. There is a need for an improved visualization apparatus that can produce high-quality, color images.

SUMMARY OF THE INVENTION

The foregoing needs, and other needs that will become apparent from the following description, are fulfilled by the present invention, which comprises, in one aspect, an inspection apparatus comprising a sensor of electromagnetic radiation; a radiation source mounted near the sensor that directs radiation toward an object that is sensed by the sensor; and a flexible, elongated shaft having a distal end coupled to the sensor and a proximal end coupled to a handheld housing, and which can maintain a flexed position. The sensor may comprise a miniature video camera and the radiation source may comprise a plurality of light-emitting diodes mounted about a perimeter of the camera to illuminate the object.

In another feature, the shaft comprises a material that withstands an ambient temperature of an engine compartment of a motor vehicle. Another feature is that the apparatus may further comprise an audio transducer mounted near the sensor that receives sounds produced by the object and that is coupled through the shaft to an audio output connector proximate to the housing. A related feature is that the audio transducer comprises one or more microphones. Still another feature is that the audio transducer comprises one or more microphones mounted in a sensor housing at the distal end of the shaft.

According to another feature, the inspection apparatus further comprises a sensor connector in the housing and coupled to the sensor to communicate a first signal representing sensed radiation to one or more external devices, and an audio output connector in the housing and coupled to the microphones to communicate a second signal representing audio sensed therefrom to the external devices. Still another feature is that the sensor and the radiation source are mounted in the sensor housing. Yet another feature is that the radiation source comprises one or more light-emitting diodes mounted around a perimeter of the sensor.

Still another feature is that the inspection apparatus has a clamp that is removably mounted to the housing. The clamp may have a mount that is flexibly coupled to the clamp and that is removably mounted to the housing.

These and other features, aspects and advantages of the present invention will become more apparent from the following detailed description of the present invention when taken in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF ILLUSTRATIVE EMBODIMENTS

An inspection apparatus is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
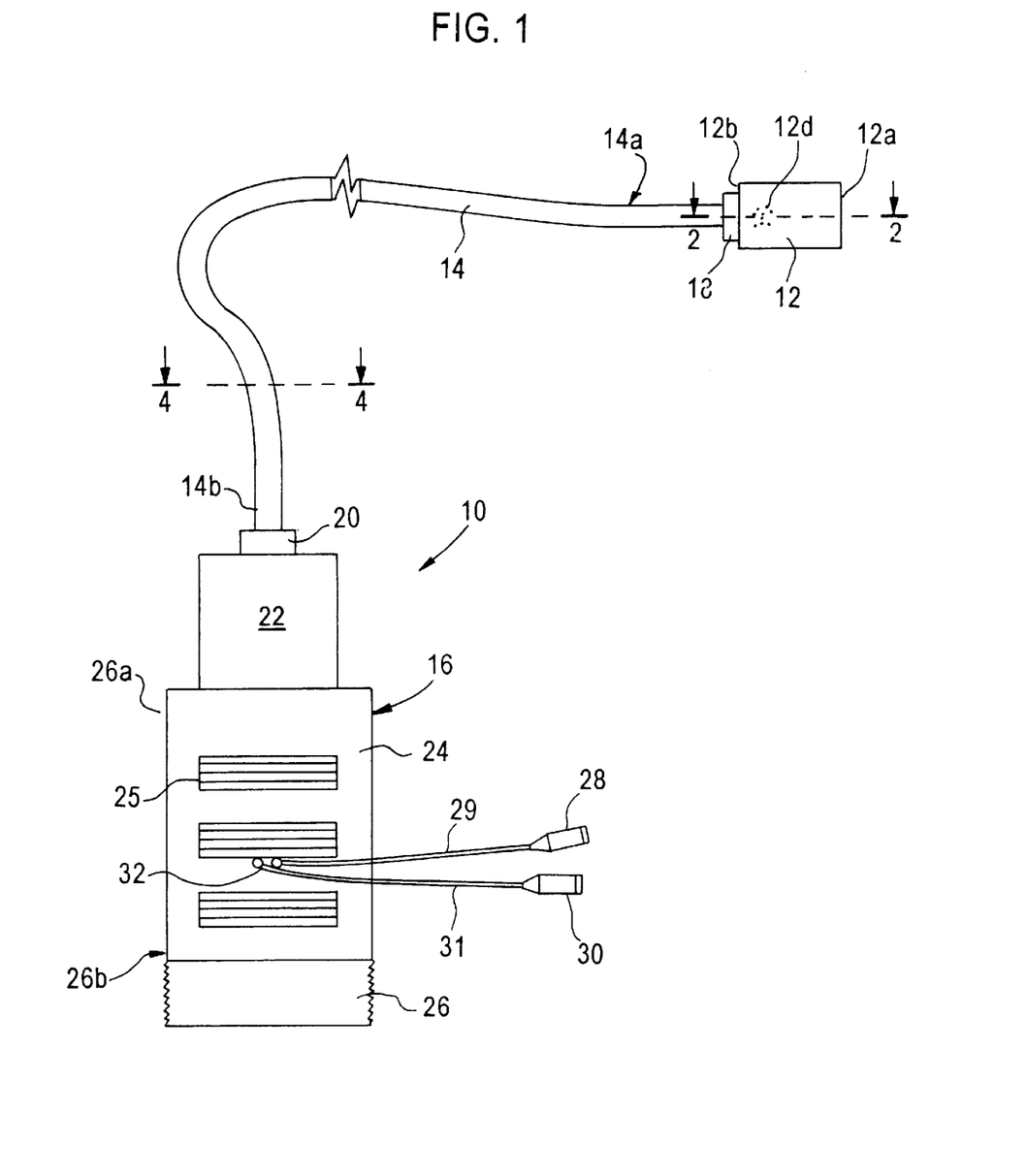
FIG. 1 is a part side elevation, part schematic view of an inspection device.

FIG. 1 is a part side elevation, part schematic view of an inspection apparatus 10, according to an exemplary embodiment. Inspection apparatus 10 generally comprises a sensor housing 12, shaft 14, and power housing 16.

Sensor housing 12 is cylindrical and has an open end 12a through which a sensor therein may receive electromagnetic radiation reflected from or emitted by an object that is inspected using the apparatus 10. Sensor housing 12 also has a closed end 12b that is coupled to a distal end 14a of shaft 14. A collar 18 or other suitable fitting may be used to fix the sensor housing 12 in place at the distal end 14.

Shaft 14 is tubular, flexible, and elongated. Preferably, wiring that supplies operating power to the sensor is routed through shaft 14 to sensor housing 12. A collar 20 or other suitable fastener may be used to secure a proximal end 14b of shaft 14 to power housing 16.

Generally, power housing 16 comprises a grip element 22, a power supply housing 24, and a switch bellows 26. Grip element 22 is cylindrical and is secured to or formed integral with power supply housing 24, and which provides a surface for attaching a removable clamp to apparatus 10. Alternatively, grip element 22 may also enclose and contain active electronics used to control the sensor in sensor housing 12 or carry out related functions such as image processing.

Power supply housing 24 is a handheld, cylindrical shell that encloses and protects a self-contained power source. Preferably, power supply housing 24 may be comfortably held in a human hand, and may have one or more knurled grips 25 to prevent slippage. The power source within power supply housing 24 may be one or more dry cell batteries, re-chargeable batteries, or other suitable source of power for the sensor.

Switch bellows 26 encloses and protects a pushbutton switch therein that turns the power source on or off. The switch is mounted in the proximal end 26b of power supply housing 24 so that pressing switch bellows 26 against any firm surface will activate the switch. Alternatively, switch bellows 26 may be eliminated from apparatus 10 and any other type of switch or switch assembly may be substituted. Use of a switch bellows 26 has been found desirable to protect the switch from damage or contamination in the motor vehicle repair environment, which is typically characterized by dirt, grease, and other contaminants.

One or more connectors 28, 30 with associated cables 29, 31 may protrude from a hole 32 in housing 24. Hole 32 may have a grommet or other means for protecting the cables from chafing or similar damage. Alternatively, connectors 28, 30 may be mounted directly in housing 24, without protruding cables.

Figure 2:
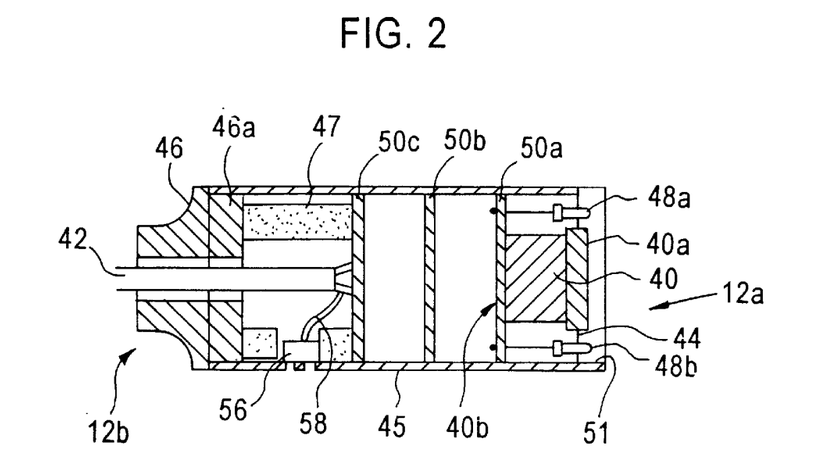
FIG. 2 is a section view of a sensor housing taken along line 2—2 of FIG. 1.

FIG. 2 is a section view of sensor housing 12 taken along line 2—2 of FIG. 1.

Sensor housing 12 may comprise a distal end wall 44, body 45, and coupling 46 in which a proximal end wall 46a is formed. In one embodiment, body 45 is a removable metal cylinder formed of anodized steel, stainless steel, etc., which is secured to coupling 46 using screws or other suitable fasteners. Wall 44 is generally circular and secured to body 45 by welding or any other suitable means.

A sensor 40 is mounted in sensor housing 12 so that its sensing end 40a protrudes through a hole in distal end wall 44. Sensor 40 is soldered or otherwise secured to a miniature circuit board 50a. Sensor 40, circuit board 50a, and one or more other circuit boards 50b, 50c contain all active electronics needed to form an image, generate a signal representative of the image, and transmit the signal to other elements of apparatus 10. Thus, sensor 40 and the electronics of circuit boards 50a–50c form a miniature, self-contained digital video camera module. A suitable camera module of this type is commercially available from Pixera, Inc., of Los Gatos, Calif. For clarity, the integrated circuits mounted on circuit boards 50a–50c are omitted from FIG. 2.

Foam packing 47 or other cushioning elements may be secured to circuit board 50c to prevent the sensor 40 and the circuit boards from compressing when body 45 is mounted to coupling 46 and secured.

The camera module operates using visible light, receives supply voltage as input and generates both a digital video signal and an analog NTSC video signal as output. In this embodiment, cable 42 carries supply voltage to the camera module and also includes a shielded cable for carrying the video signals to other elements of apparatus 10. Cable 42 may be soldered to circuit board 50c or otherwise coupled to electronics in the sensor module.

The sensor may be a video camera, an audio sensor such as a microphone, infrared detector, infrared camera, an ultrasound transducer, or any other passive or active device for sensing electromagnetic radiation in any frequency range.

The sensor 40 or camera module may include a lens having any suitable focal length. In one embodiment, a fixed focal length lens is used. Examples of suitable focal lengths are ½" to infinity, 1" to infinity, etc. Variable focal length lenses are also appropriate. Interchangeable lenses may be selectively mounted or dismounted.

Alternatively, a plurality of lenses may be used. The lenses can be mounted in a turret mount that is rotated by a technician to bring a desired lens into alignment with the iris of the camera module. A manual or power zoom lens may also be used. For a power zoom lens, zoom controls may be mounted in power housing 16, or may be interfaced to an external device for control by that device.

In still another alternative, an inner surface 51 of end 12a of sensor housing 12 may have threads with which the sensor housing may be secured to a bore scope or to an adapter for a bore scope. This enables apparatus 10 to be used for inspection of engine cylinders.

One or more radiation sources 48a, 48b are mounted in sensor housing 12, for example, by solder connections to circuit board 50a. Radiation sources 48a, 48b are mounted in appropriate holes in wall 44, so that light produced by the radiation sources is directed out of the sensor housing and onto an object that is being inspected with apparatus 10. In one embodiment, radiation sources 48a, 48b are light emitting diodes. Two LEDs are depicted in FIG. 2; however, any number may be used.

Circuit board 50a provides mechanical strength and a location at which terminals of the radiation sources may be coupled electrically to wires in cable 42. In one embodiment, one cable or set of wires provides supply voltage to both sensor 40 and the radiation sources.

Figure 5A:
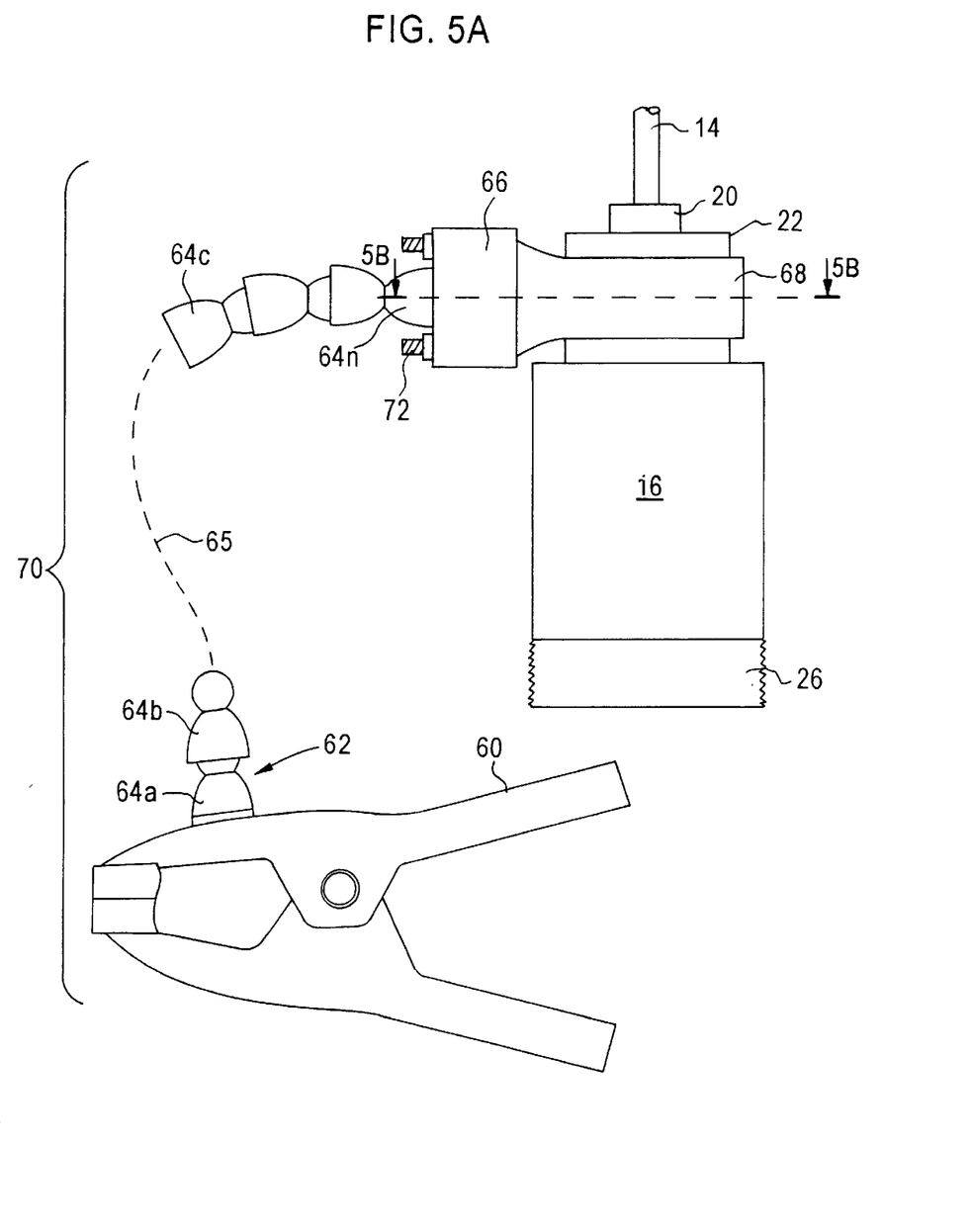
FIG. 5A is a side elevation view of a portion of an inspection device and a clamp attachment.
Figure 5B:
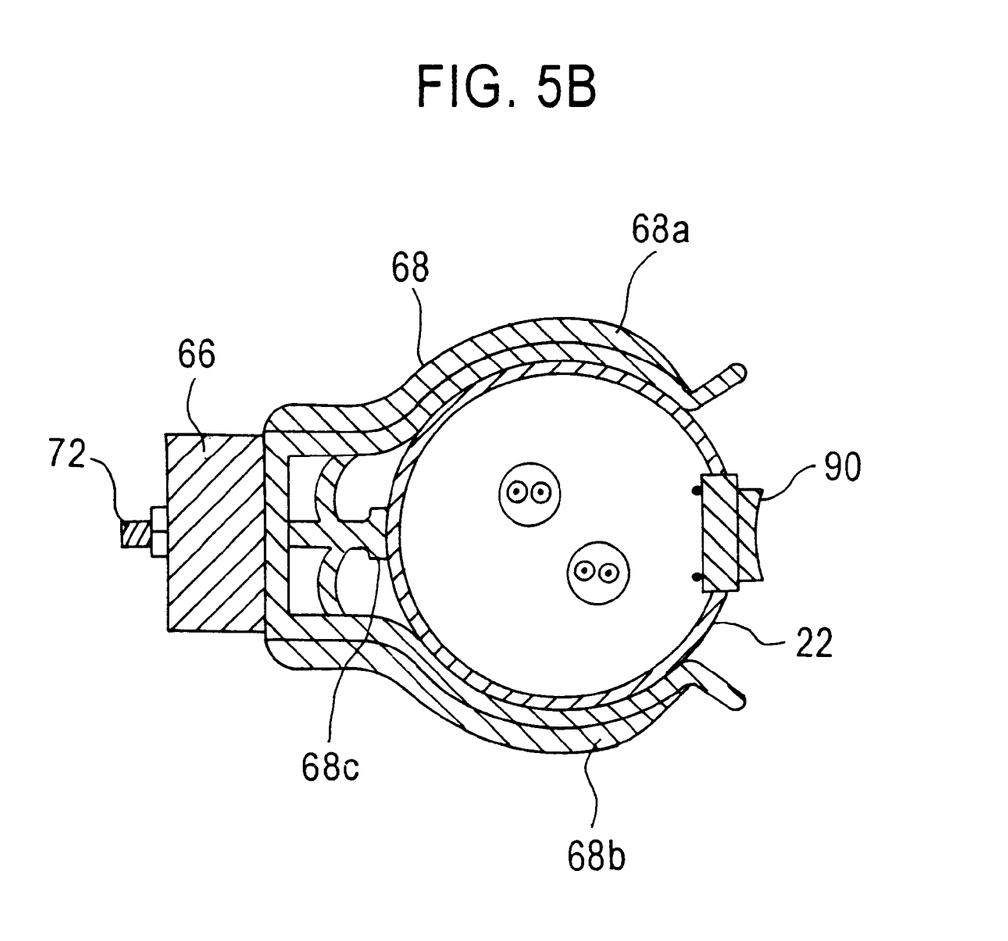
FIG. 5B is a section view taken along line 5B—5B of FIG. 5A.

In one embodiment, grip element 22 includes a switch, such as a rocker switch 90 as shown in FIG. 5B, coupled in series downstream from the main power switch, and which may be used to switch the supply voltage to the radiation sources 48a, 48b. Thus, the apparatus 10 may be turned on by operating switch bellows 26, but radiation sources 48a, 48b would remain off unless switch 90 of grip element 22 is activated. Alternatively, supply voltage for radiation sources 48a, 48b may be switched by the switch that is in switch bellows 26.

Figure 3:
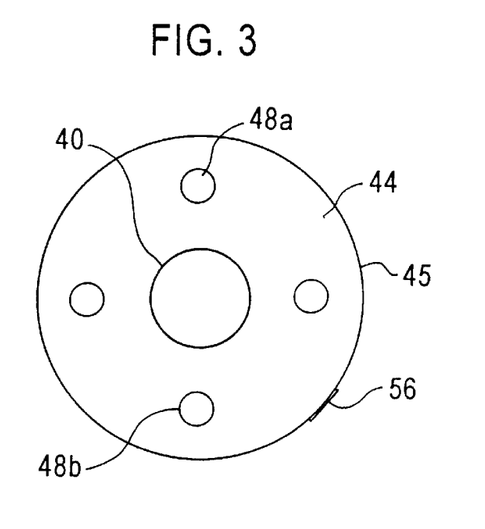
FIG. 3 is an end elevation view of a sensor housing.

FIG. 3 is an end elevation view of sensor housing 12. Radiation sources 48a, 48b may be secured in wall 44 circumferentially around end 40a of sensor 40 so as to provide evenly spaced illumination to objects that are inspected by sensor 40, as indicated in FIG. 3.

Referring again to FIG. 2, one or more transducers 56 may be secured in body 45. The transducers 56 receive sound waves or electromagnetic radiation from outside sensor housing 12, and transduce the waves or radiation into electrical signals. The signals may be communicated to other elements of apparatus 10 through wires 58 which are coupled to cable 42.

In one embodiment, transducers 56 are microphones, and wires 58 communicate stereo audio signals from the microphones to other elements of apparatus 10. This enables a technician to hear sounds produced by a part under inspection in coordination with information that is generated by sensor 40. Use of stereo microphones improves sound quality and clarity.

Figure 4:
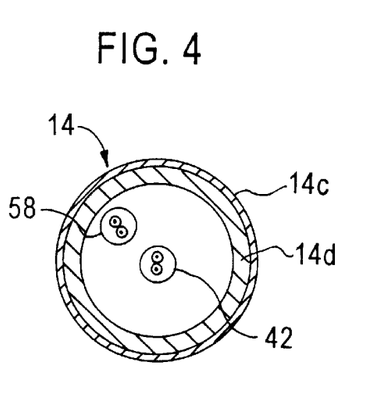
FIG. 4 is a section view of a shaft taken along line 4—4 of FIG. 1.

FIG. 4 is a section view of shaft 14 taken along line 4—4 of FIG. 1.

Shaft 14 may comprise a material that is capable of withstanding engine heat, so that the apparatus 10 may be used in or near an engine or other warm areas of a motor vehicle. Shaft 14 may comprise an outer heat-resistant sheath 14c affixed to a flexible inner shaft 14d. Suitable sheathing material is TEFLON®, which is commercially available from E. I. du Pont de Nemours & Co., and its affiliates. In one embodiment, inner shaft 14d is a metal, spiral-wound element such as a gooseneck of the type useful for holding mirrors, lamps, etc.

In this combination, the sheath 14c provides heat resistance and some rigidity, and inner shaft 14d contributes mechanical stiffness and controlled flexibility to the combination. This combination is not required, however. For example, a single heat-resistant material may be used; a TEFLON®-coated shaft may be used; a different heat-resistant material may be used; and other equivalent combinations may be used.

Within shaft 14, wires 58 and cable 42 travel from sensor housing 12 to power housing 16. In one embodiment, wires 58 from transducers 56 terminate at connector 28, and cable 42 from sensor 40 terminates at connector 30. In this embodiment, a technician may connect the apparatus 10 to an external device. When sensor 40 is a video camera and transducers 56 are microphones, a technician may connect connectors 28, 30 to suitable inputs of a videotape recorder. Accordingly, the technician can record video signals and audio signals produced by the apparatus 10 while it is inspecting a part of a device.

Alternatively, the technician may connect connectors 28, 30 to a video monitor so that the technician can see and hear, without recording, images and sounds produced by apparatus 10.

In yet another alternative, the technician may connect the connectors to inputs of a videoconferencing system. The technician could place a videoconference call to a manufacturer of the vehicle or part that is being inspected, conduct a voice or video conversation with a representative of the manufacturer, and switch the video input of the videoconference equipment to the inspection apparatus at an appropriate point in the discussion. This would enable the technician to show the manufacturer, in real time, the results of inspection and learn how to address any problem that is identified. A significant savings of time in diagnosis and repair may be realized.

In another alternative, apparatus 10 may be interfaced to a computer. For example, cable 42 or connector 30 may be coupled a Universal Serial Bus (USB) connector or dongle having a video jack for an input analog video signal and a USB connector that provides a digital video output signal. The dongle contains active electronics that convert or adapt video signals from the camera module into signals that can be communicated across a USB port. In this combination, a technician could capture single-frame digital images ("snapshots") of a video image of a part under inspection and transmit the snapshots to a manufacturer for evaluation.

Alternatively, a computer interface connector may be affixed in a wall of the power housing and connected to the computer using a separate cable. These alternatives enable the technician to view and record images using the computer.

FIG. 5A is a side elevation view of a portion of inspection apparatus 10 showing a clamp attachment 70.

A hand clamp 60 is secured to a flex joint assembly 62. Hand clamp 60 may be any clamp or equivalent device that enables a technician to temporarily secure apparatus 10 to a part of a device that is being inspected. For example, in the motor vehicle repair context, a technician could clamp the hand clamp 60 to a frame member or body member of the motor vehicle, and then adjust shaft 14 to place sensor housing 12 in a desired location. Hand clamp 60 may be a C-clamp, sliding clamp, etc. An example of a hand clamp that is suitable is a Pony brand clamp, model 3251.

Flex joint assembly 62 comprises one or more ball-and-socket flex elements 64a, 64b, 64c, 64n which snugly fit together to form a strong, flexible joint of variable length. The flex elements are rotatable as well as flexible, so that apparatus 10 may be positioned anywhere in relation to hand clamp 60. There may be any number of flex elements. Suitable flex elements are commercially available under the brand name Loc-Line.

One flex element 64n is secured to a mounting block 66 using a screw or other suitable fastener. Mounting block 66 is secured to a press-fit clamp 68 by fasteners 72, which may be screws or equivalent fasteners. Alternatively, press-fit clamp 68 is formed integral with mounting block 66, or clamp 68 may be formed integral with flex element 64n. A suitable press-fit clamp is commercially available from Mag Instrument of Ontario, Calif.

FIG. 5B is a section view taken along line 5B—5B of FIG. 5A, and shows that press-fit clamp may have a pair of curved arms 68a, 68b which extend around and tightly grip the perimeter of grip element 22. Thus, clamp assembly 70 may be attached to apparatus 10 by firmly pressing press-fit clamp 68 against grip element 22 so that arms 68a, 68b snap into position. Clamp 68 also includes a stop 68c that extends laterally inwardly. When clamp 68 is secured on grip element 22, the outer surface of the grip element rests snugly against stop 68c.

This configuration provides a useful removable clamp. A technician may firmly attach the inspection apparatus 10 to a motor vehicle or other device under inspection. Also, the technician may quickly and easily remove the clamp assembly 70 and use the apparatus 10 in handheld manner.

Figure 6:
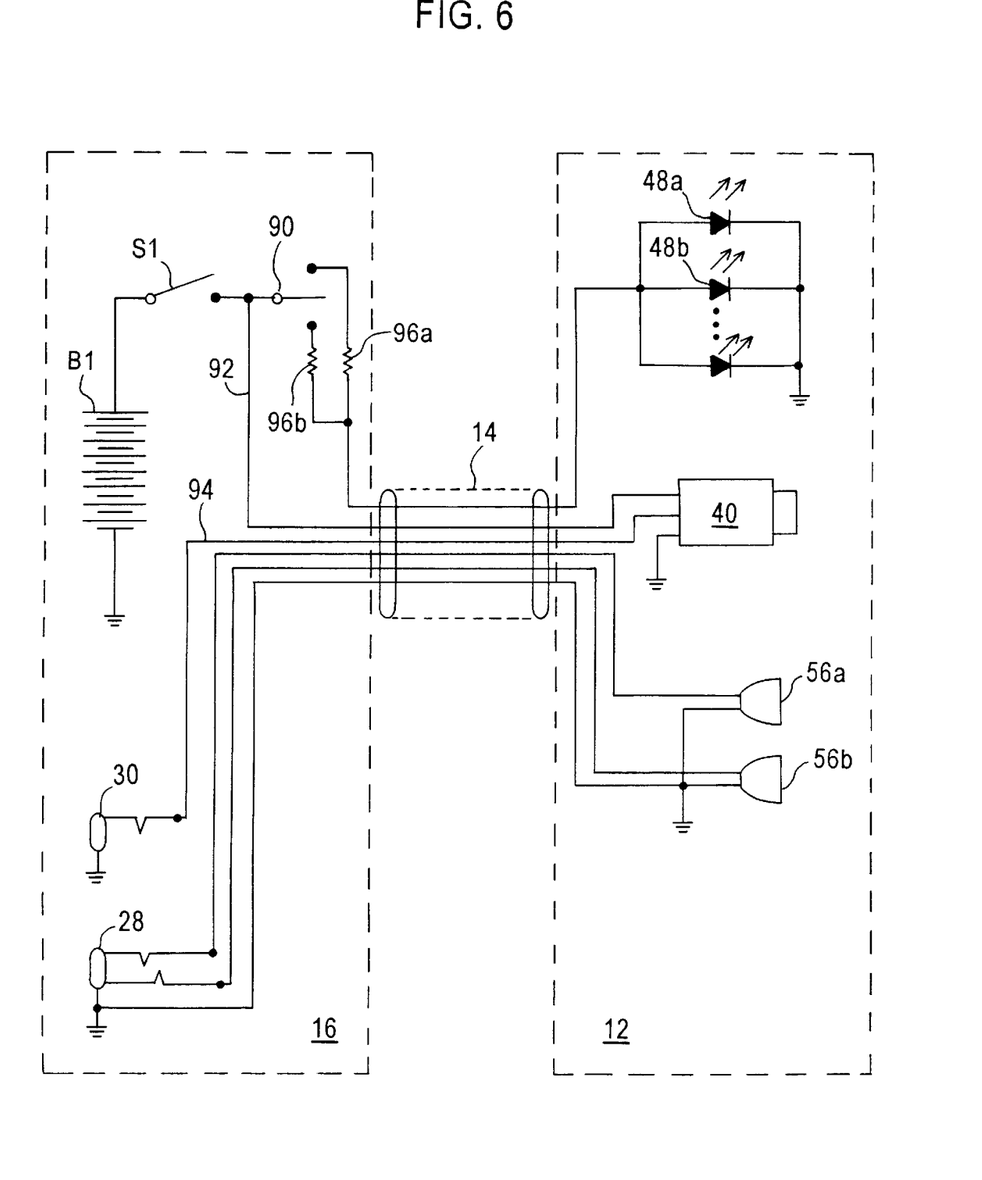
FIG. 6 is a schematic diagram of electrical connections of an inspection device.

FIG. 6 is a schematic diagram of electrical connections of one embodiment of an inspection device.

Battery B1 provides supply voltage to active elements of the apparatus. Typically B1 is a plurality of series-coupled nickel-cadmium rechargeable batteries or AA-type dry cell batteries. A sealed rechargeable battery pack also may be used. Main power switch S1, which may be contained within bellows 26, selects whether the apparatus is ON or OFF. Switch 90, which may be mounted in grip element 22 or on power supply housing 24, selects whether voltage is coupled from battery B1 through shaft 14 to radiation sources 48a, 48b. Switch 90 may be a center-off, double-throw switch that selects a voltage path through one of two resistors 96a, 96b. This arrangement enables radiation sources 48a, 48b to operate selectively at a low brightness level or high brightness level. Alternatively, a potentiometer could be used, or other means for varying voltage or current supplied to the radiation sources. In this embodiment, radiation sources 48a, 48b are illustrated in the form of light-emitting diodes.

Circuit branch 92 is coupled from switch S1 to sensor 40 and thereby supplies voltage to the sensor when switch S1 is closed. An output signal from sensor 40 is coupled on wire 94, which may be located mechanically within cable 42 of FIG. 2, to connector 30. In one embodiment, connector 30 is an RCA-type video jack. Thus, connector 30 may provide an analog NTSC video signal from sensor 40 to an external device.

Transducers 56 are coupled through shaft 14 to connector 28, which may be a stereo jack. In this embodiment, transducers 56 are passive devices, such as electret condenser microphones, and do not receive supply voltage.

An inspection apparatus of the foregoing embodiments is useful for many inspection tasks. In the motor vehicle repair context, the apparatus may be used for inspection of intake manifolds which may overlap themselves such that manual inspection of injectors, cables, etc., is impractical. The apparatus may be used to inspect wiring harnesses for chafing and breaks, to inspect under the dashboard area, etc. The apparatus may be introduced into very tight spaces. When a color camera is used, the apparatus provides color perception for wiring identification. Significant time savings will result.

Using the microphones or similar transducers, distinctive sounds that identify mechanical problems (rattle, hum, etc.) may be detected and used to direct the sensor or camera to the noise.

The present invention has been described and illustrated in detail, however, the foregoing description is provided by way of illustration and example only, and is not a limitation on the spirit and scope of the present invention, which is defined more specifically by the terms of the appended claims.

What is claimed is:

1. Inspection apparatus, comprising:
   a sensor of electromagnetic radiation;
   a radiation source mounted near the sensor that directs radiation toward an object that is sensed by the sensor; and
   a flexible, elongated shaft having a distal end coupled to the sensor and a proximal end coupled to a handheld housing, and which can maintain a flexed position;
   wherein the distal end of the flexible shaft is adapted to attach to a bore scope.

2. Inspection apparatus as recited in claim 1, wherein the sensor comprises a miniature video camera and the radiation source comprises a plurality of light-emitting diodes mounted about a perimeter of the camera to illuminate the object.

3. Inspection apparatus as recited in claim 1, wherein the shaft comprises a material that withstands an ambient temperature of an engine compartment of a motor vehicle.

4. Inspection apparatus as recited in claim 1, further comprising an audio transducer mounted near the sensor that receives sounds produced by the object and that is coupled through the shaft to an audio output connector proximate to the housing.

5. Inspection apparatus as recited in claim 4, wherein the audio transducer comprises one or more microphones.

6. Inspection apparatus as recited in claim 4, wherein the audio transducer comprises one or more microphones mounted in a sensor housing at the distal end of the shaft.

7. Inspection apparatus as recited in claim 6, further comprising a sensor connector in the housing and coupled to the sensor to communicate a first signal representing sensed radiation to one or more external devices, and an audio output connector in the housing and coupled to the microphones to communicate a second signal representing audio sensed therefrom to the external devices.

8. Inspection apparatus as recited in claim 6, wherein the sensor and the radiation source are mounted in the sensor housing.

9. Inspection apparatus as recited in claim 6, wherein the radiation source comprises one or more light-emitting diodes mounted around a perimeter of the sensor.

10. Inspection apparatus as recited in claim 1, further comprising a clamp that is removably mounted to the housing.

11. Inspection apparatus as recited in claim 1, further comprising a clamp having a mount that is flexibly coupled to the clamp and that is removably mounted to the housing.

12. A motor vehicle inspection apparatus, comprising:
    a video camera;
    a light source mounted near the video camera and that directs light toward a part of a motor vehicle that is viewed by the video camera; and
    an elongated, flexible shaft having a distal end coupled to the video camera and a proximal end coupled to a handheld housing, and which can maintain a flexed position;
    wherein the distal end of the flexible shaft is adapted to attach to a bore scope.

13. A motor vehicle inspection apparatus as recited in claim 12, further comprising a clamp that is removably mounted to the housing.

14. A motor vehicle inspection apparatus as recited in claim 12, further comprising a clamp having a mount that is flexibly coupled to the clamp and that is removably mounted to the housing.

15. A motor vehicle inspection apparatus as recited in claim 12, wherein the light source comprises a plurality of light-emitting diodes mounted about a perimeter of the camera to illuminate objects viewed by the camera.

16. A motor vehicle inspection apparatus as recited in claim 12, wherein the shaft comprises a material that withstands an ambient temperature of a motor vehicle engine compartment.

17. A motor vehicle inspection apparatus as recited in claim 12, further comprising an audio transducer mounted near the sensor and coupled through the shaft to an audio output connector proximate to the housing.

18. A motor vehicle inspection apparatus as recited in claim 17, wherein the audio transducer comprises one or more microphones.

19. A motor vehicle inspection apparatus as recited in claim 12, further comprising a sensor connector in the housing and coupled to the sensor to communicate a first signal representing sensed radiation to one or more external devices, and an audio output connector in the housing and coupled to the microphones to communicate a second signal representing audio sensed therefrom to the external devices.

20. A motor vehicle inspection apparatus, comprising:
   a video camera that may view a part of a motor vehicle;
   a light source mounted near the video camera and that directs light toward a part of a motor vehicle that is viewed by the video camera;
   an elongated, flexible shaft having a distal end coupled to the video camera and a proximal end coupled to a handheld housing, and which can maintain a flexed position;
   a self-contained power source in the housing for powering the video camera and the light source;
   an audio transducer mounted near the video camera and coupled through the shaft to an audio output connector; and
   a clamp that is removably mounted to the housing and that may grip a part of the motor vehicle;
   wherein the distal end of the flexible shaft is adapted to attach to a bore scope.

21. The inspection apparatus of claim 1 further comprising a bore scope attached to the distal end of the flexible shaft.

22. The inspection apparatus of claim 1, wherein the distal end of the flexible shaft includes threads for engaging with a bore scope.

23. The motor vehicle inspection apparatus of claim 12 further comprising a bore scope attached to the distal end of the flexible shaft.

24. The motor vehicle inspection apparatus of claim 12, wherein the distal end of the flexible shaft includes threads for engaging with a bore scope.

25. The motor vehicle inspection apparatus of claim 20 further comprising a bore scope attached to the distal end of the flexible shaft.

26. The motor vehicle inspection apparatus of claim 20, wherein the distal end of the flexible shaft includes threads for engaging with a bore scope.

* * * * *